(12) United States Patent
Murata

(10) Patent No.: US 11,399,004 B2
(45) Date of Patent: *Jul. 26, 2022

(54) METHOD, SERVER, AND PROGRAM FOR MANAGING NOTIFICATION

(71) Applicant: GREE, Inc., Tokyo (JP)

(72) Inventor: Keisuke Murata, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/317,836

(22) Filed: May 11, 2021

(65) Prior Publication Data

US 2021/0266286 A1    Aug. 26, 2021

Related U.S. Application Data

(63) Continuation of application No. 16/421,160, filed on May 23, 2019, now Pat. No. 11,032,230, which is a continuation of application No. 14/495,592, filed on Sep. 24, 2014, now Pat. No. 10,333,883.

(30) Foreign Application Priority Data

Sep. 30, 2013    (JP) .................................. 2013204206

(51) Int. Cl.
| | | |
|---|---|---|
| *H04L 12/58* | (2006.01) | |
| *H04L 51/52* | (2022.01) | |
| *A63F 13/50* | (2014.01) | |
| *A63F 13/87* | (2014.01) | |
| *A63F 13/795* | (2014.01) | |
| *A63F 13/73* | (2014.01) | |
| *H04W 4/12* | (2009.01) | |
| *H04L 67/131* | (2022.01) | |
| *H04L 51/224* | (2022.01) | |
| *H04W 4/21* | (2018.01) | |

(52) U.S. Cl.
CPC .............. *H04L 51/32* (2013.01); *A63F 13/50* (2014.09); *A63F 13/73* (2014.09); *A63F 13/795* (2014.09); *A63F 13/87* (2014.09); *H04L 51/24* (2013.01); *H04L 67/38* (2013.01); *H04W 4/12* (2013.01); *H04W 4/21* (2018.02)

(58) Field of Classification Search
CPC ......... H04L 51/32; H04L 51/24; H04L 67/38; A63F 13/50; A63F 13/87; A63F 13/795; A63F 13/73; H04W 4/12; H04W 4/206
See application file for complete search history.

(56) References Cited

U.S. PATENT DOCUMENTS

| | | | | |
|---|---|---|---|---|
| 2007/0055534 A1* | 3/2007 | Lau | ........................ | G06Q 30/02 705/1.1 |
| 2012/0309540 A1* | 12/2012 | Holme | .................... | H04L 67/26 463/42 |

(Continued)

*Primary Examiner* — Shean Tokuta
*Assistant Examiner* — Juan C Turriate Gastulo
(74) *Attorney, Agent, or Firm* — Xsensus LLP

(57) ABSTRACT

A controller stores a new notification in a storage section when receiving a new notification to a user device. The controller checks, in the storage section, a use status of an application of the user device. The controller determines a notification method for outputting the notification stored in the storage section to an application display of the application when determining that the application is in use based on the use status.

20 Claims, 6 Drawing Sheets

(56) References Cited

U.S. PATENT DOCUMENTS

2013/0331192 A1\* 12/2013 Betti ................... A63F 13/798
 463/42
2014/0189533 A1\* 7/2014 Krack .................. G06F 3/0481
 715/753

\* cited by examiner

METHOD, SERVER, AND PROGRAM FOR MANAGING NOTIFICATION

CROSS-REFERENCE TO RELATED APPLICATIONS

This application is a continuation of U.S. application Ser. No. 16/421,160, filed May 23, 2019, which is a continuation of U.S. application Ser. No. 14/495,592, filed Sep. 24, 2014, and is based upon and claims benefit of priority of Japanese Application No. 2013-204206, filed Sep. 30, 2013. The entire contents of each of which are incorporated herein by reference.

FIELD OF THE INVENTION

The present invention relates to a method, a server, and a program for managing a notification to a user.

BACKGROUND OF THE INVENTION

In recent years, various types of games have been provided through networks. Such games include social network games that are provided on social network services (SNS).

Technologies for managing the status of characters (game characters) that appear in such games have been sought (see Japanese Laid-Open Patent Publication No. 2001-87543, for example). In the technology disclosed in the document, when a game character is attacked from another game character, an accumulated damage is calculated as a value of a parameter indicating the status of the game character. A motion reproduction sequence is determined according to a stress value, which is recovered when time elapses after the game character is damaged.

Further, technologies for increase interest of each user by synergistic effects between users have also been sought (see Japanese Laid-Open Patent Publication No. 2013-163030, for example). A server disclosed in this document stores a plurality of pieces of first property data in association with each user, and stores second property data in association with each group to which the plurality of pieces of first property data belong. In a case where a predetermined event occurs while a first user is playing a game, the server selects another user, and makes a determination for each group whether all the property data belonging to the group is contained in a first property data set that includes the first property data associated with the first user and the first property data associated with the other user. The server takes a predetermined action to a group that includes all the property data belonging to the group as a result of the determination among the first property data set based on the second property data associated with the group in addition to the property data contained in the first property data set.

Also, technologies for motivating a user watching an online game to support another user who is playing the game (see Japanese Laid-Open Patent Publication No. 2013-63296, for example). A server disclosed in this document determines whether a specific condition is satisfied based on support information. In a case where the specific condition is satisfied, the server cancels a limitation on execution of a specific command. In a case where the execution of the specific command is not limited, the server causes the specific command to be executed based on operation information from a player.

As disclosed in Japanese Laid-Open Patent Publication No. 2001-87543, the status of the game character is changed as time elapses. As disclosed in Japanese Laid-Open Patent Publication No. 2013-163030, a plurality of users may cooperate with each other in a game. As disclosed in Japanese Laid-Open Patent Publication No. 2013-63296, the support to another user may be needed.

However, in a case where many applications are supplied, these applications may be separately managed. For example, in a case where the respective applications are supplied from different providers, each provider cannot know the status of the applications managed by other providers. Therefore, in a case where a specific application is used, the user cannot know whether the status in another application is changed. For example, in a case where the user cannot know the life recovery status of a game character, it is difficult to play the game timely. Further, in a case where the user cannot promptly know a request (such as a support request) for cooperation from another user, it is difficult to deal with such a request properly.

Further, when using a first application such as a game, the user may retrieve a notification through an electronic mail or the like. In this case, the user needs to activate a second application (for example, a mailer or the like) for displaying the notification in addition to the first application in use. In this case, the user may miss the notification, or may need to take time and effort to activate the second application.

SUMMARY OF THE INVENTION

Accordingly, an objective of embodiments of the invention is to provide a notification management method, a notification management server, and a notification management program for efficiently issuing a notification to a user.

To achieve the foregoing objective and in accordance with one aspect of the present invention, a method for managing a notification is provided. The method includes using a controller to operate as follows. When receiving a new notification to a user device, the controller stores the new notification in a storage section. The controller checks, in the storage section, a use status of an application of the user device. When determining that the application is in use based on the use status, the controller determines a notification method for outputting the notification stored in the storage section to an application display of the application.

In accordance with another aspect of the present invention, a server for managing a notification is provided that includes a storage section, which stores a use status of an application in a user device and a notification to the user device, and a controller, which is connected to the user device through a network. The controller is configured to operate as follows. When receiving a new notification to the user device, the controller stores the new notification in the storage section. The controller checks, in the storage section, a use status of an application of the user device. When determining that the application is in use based on the use status, the controller determines a notification method for outputting the notification stored in the storage section to an application display of the application.

In accordance with a further aspect of the present invention, a non-transitory computer-readable storage medium is provided that stores a program for performing a method for managing a notification by using a storage section, which stores a use status of an application in a user device and a notification to the user device and a controller, which is connected to the user device through a network. When the program is executed, the controller operates as follows. When receiving the new notification to the user device, the controller stores the new notification in the storage section. The controller checks, in the storage section, a use status of an application of the user device. When determining that the application is in use based on the use status, the controller determines a notification method for outputting the notification stored in the storage section to an application display of the application.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a first embodiment of a notification management method will be described with reference to FIGS. 1 to 3. In this embodiment, a case is assumed in which various notifications are issued to users using a plurality of applications (for example, games).

Figure 1:
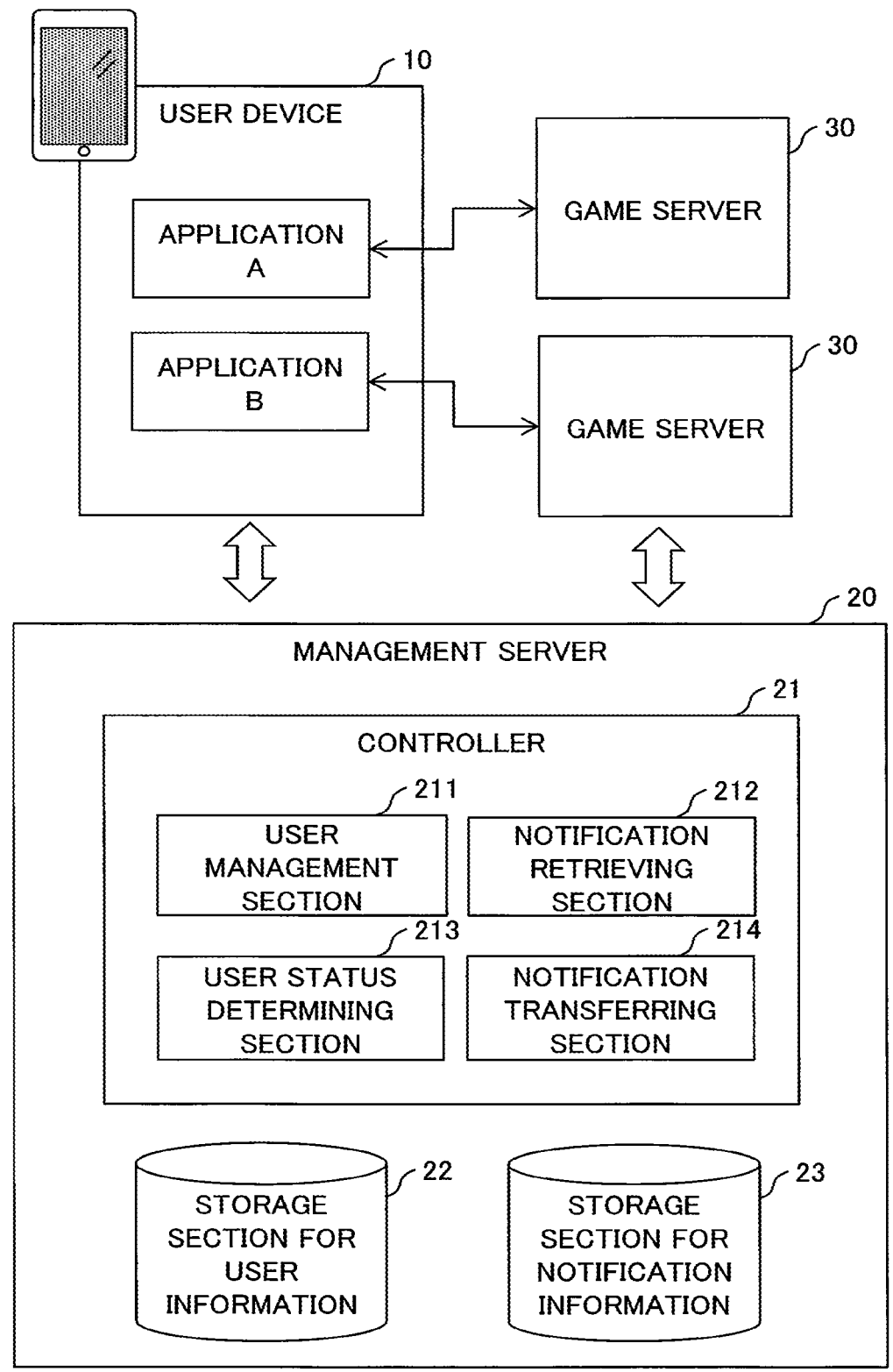
FIG. 1 is a schematic diagram illustrating a system according to a first embodiment.
Figure 2:
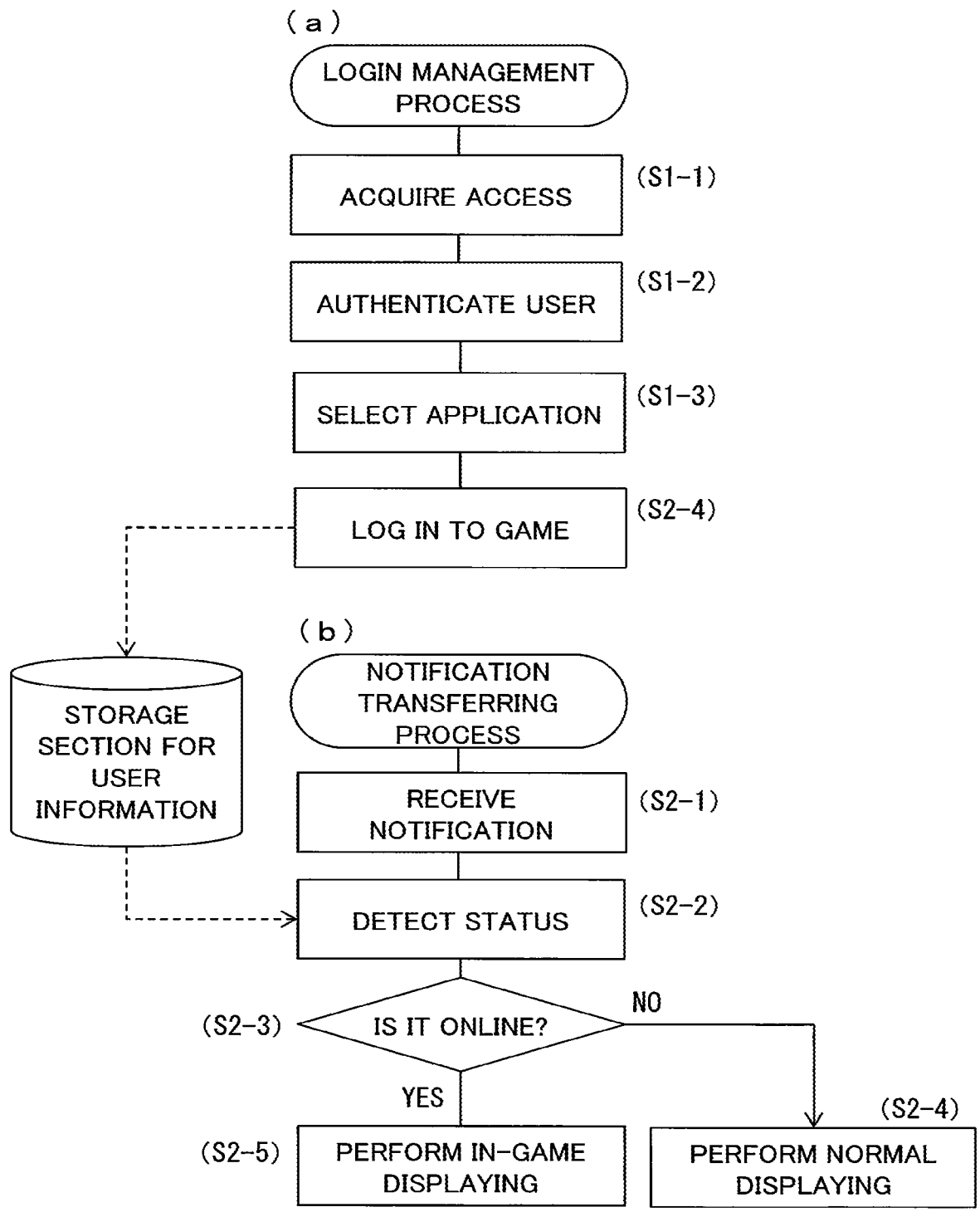
FIG. 2 is an explanatory diagram showing (a) a login management process and (b) a notification transferring process in the system of FIG. 1.

As illustrated in FIG. 1, a user device 10, a management server 20, and a plurality of game servers 30 are used in the present embodiment. The user device 10, the management server 20, and the game servers 30 are connected to each other through a network such as the Internet.

The user device 10 is a computer device (an information processing device such as a smartphone) of a user who has been registered. The user can participate in a game provided from the game server 30 using the user device 10. Further, the user may manage a local calendar in the user device 10 or participate in various social network services (SNSs) using the user device 10.

The game server 30 is a server computer that supplies various types of games in the Internet. In the present embodiment, the game server 30 supplies a game service to the user device 10. Further, for example, in a case where the life of a user's game character is recovered in a battle game or the like, or in a case where the user asks another user for cooperation in a scene where the user's game character cooperates with his fellow's game character to fight against an enemy, the game server 30 transmits a notification (life information and cooperation request) to the management server 20.

The management server 20 is a computer system that manages a user who uses a plurality of applications through the user device 10. Specifically, the management server 20 serves as an infrastructure system (platform) that manages game services provided from various types of game servers 30 according to the users of the user devices 10. The management server 20 includes a controller 21, which is provided with a CPU, a RAM and a ROM, a storage section for user information 22, and a storage section for notification information 23.

The controller 21 serves as a user management section 211, a notification retrieving section 212, a user status determining section 213, and a notification transfer section 214 by executing a management program.

The user management section 211 manages users who use various types of applications.

The notification retrieving section 212 retrieves various types of notifications transmitted from the game server 30. In the present embodiment, the notification retrieving section 212 retrieves a notification relating to the life information and the cooperation request transmitted from the game server 30.

The user status determining section 213 determines a status in the user device 10. In the present embodiment, the user status determining section 213 determines whether the user device 10 is online.

The notification transfer section 214 transmits the notification to the user device 10. The notification transfer section 214 holds transfer scheme determination information with which a transfer scheme is determined according to the status of the user device 10.

The storage section for user information 22 stores information for authenticating a user and user management information relating to the game that the user is using. The storage section for user information 22 stores the user management information at the time of user registration in the platform, and updates the status according to the use status of the user device 10. The user management information contains data relating to a user ID, a login password, a currently-used game, and a status.

In a user ID data area, data relating to identifiers for identifying the respective users is stored.

In a login password data area, data for authenticating users in a case where users log in to the management server 20 is stored.

In a currently-used game data area, data relating to identifiers (game IDs) for identifying games that users are using is stored.

In a status data area, data for identifying the status of the user device 10 is stored. With reference to the status, the user status determining section 213 can determine whether the user device 10 is online.

When retrieving a notification from the game server 30, the storage section for notification information 23 stores notification management information on the respective users. In the notification management information, data relating to a user ID, a game ID, a retrieval time, a notification type, and notification content is stored.

In the user ID data area, data relating to identifiers for identifying the respective users is stored. In a game ID data area, data relating to identifiers for identifying games related to notifications to users is stored. In a retrieval time data area, data relating to the date and time at which the notification is retrieved is stored.

In a notification type data area, data for identifying the type of the received notification is stored. In the present embodiment, the notification type includes a life gauge and a cooperation request of the game character.

In a notification content data area, data relating to the content of the notification is stored. For example, in the case of the notification the type of which is the life gauge, information indicating the game character that the user uses and the recovery status of the life gauge (power or force) of the game character are contained in the content. In the case of the notification the type of which is the cooperation request, a message retrieved by the user from another user is contained in the content.

Next, regarding a processing procedure of the notification management method, which is performed using the management server 20, a login management process and a notification transferring process will be described in this order with reference to FIGS. 2 and 3.

The login management process will be described with reference to FIG. 2(*a*). The controller 21 of the management server 20 performs an access retrieving process (Step S1-1). Specifically, in a case where the user plays the game, the user accesses the management server 20 using the user device 10. In this case, the user management section 211 of the controller 21 outputs a login view to a display of the user device 10. The user inputs a user ID and a login password in the login view. The user management section 211 retrieves the user ID and the login password input in the login view of the user device 10.

Next, the controller 21 performs a user authenticating process (Step S1-2). Specifically, in a case where the user ID and the login password retrieved from the user device 10 have already been registered in the storage section for user information 22, the user management section 211 successfully passes a login authentication and ends the login process. When the login authentication is completed, the user ID of the logged-in user is identified. In this case, the user management section 211 stores, as a status of the user device 10, the login to the management server 20 in the user management information of the storage section for user information 22.

Next, the controller 21 performs an application selecting process (Step S1-3). Specifically, the user management section 211 outputs a selection view, which shows a list of games that the logged-in user uses, to the display of the user device 10. In this case, it is assumed that the user selects an application A as a game. The user management section 211 retrieves application selection information indicating the selected application from the user device 10. The application selection information contains data relating to the game ID.

Next, the controller 21 performs a game login notifying process (Step S1-4). Specifically, the user management section 211 provides the game server 30 of the selected application A with notice about the login of the user of the user device 10. The user management section 211 stores, as a status of the user device 10, a logged-in state to Game A in the user management information of the storage section for user information 22.

The notification transferring process will be described with reference to FIG. 2(*b*). The controller 21 performs a notification receiving process (Step S2-1). Specifically, the notification retrieving section 212 of the controller 21 retrieves a notification addressed to each user from the game server 30. In the present embodiment, the notification is retrieved from the game server 30, which supplies an application to which the user has not logged in. In this case, the notification retrieving section 212 identifies the notification type of the retrieved notification. The notification retrieving section 212 generates the notification management information containing the user ID, the game ID, the retrieval time, the notification type, and the notification content, and registers the notification management information in the storage section for notification information 23.

Next, the controller 21 performs a status detecting process (Step S2-2). Specifically, the user status determining section 213 of the controller 21 extracts, from the storage section for user information 22, the user management information, which contains the user ID indicating a destination of the notification. In other words, the user status determining section 213 reads the user management information associated with the user ID out of the storage section for user information 22. The user status determining section 213 identifies the status stored in the user management information.

Next, the controller 21 performs a determining process to determine whether the user device 10 is online (Step S2-3). Specifically, in a case where "login" information is stored in the user management information as the status of the user device 10, the user status determining section 213 determines that the user device 10 is online.

In a case where the "login" information is not stored in the user management information and thus it is determined that the user device 10 is not online ("NO" in Step S2-3), the controller 21 performs a normal display process (Step S2-4). Specifically, the notification transfer section 214 of the controller 21 transfers the notification by a normal transfer scheme (for example, electronic mail, push notification, posting on a personal board of an SNS application, and the like) corresponding to the case where the user device 10 is not online, using the transfer scheme determination information. In a case where the user confirms the notification by the normal transfer scheme, the user needs to activate a separate application in order to display the notification.

In contrast, in a case where it is determined that the user device 10 is online ("YES" in Step S2-3), the controller 21 performs an in-game display process (Step S2-5). Specifically, the notification transfer section 214 identifies the game to which the user of the user device 10 has logged in based on the status in the user management information. The notification transfer section 214 outputs an online notification to a game view.

Figure 3:
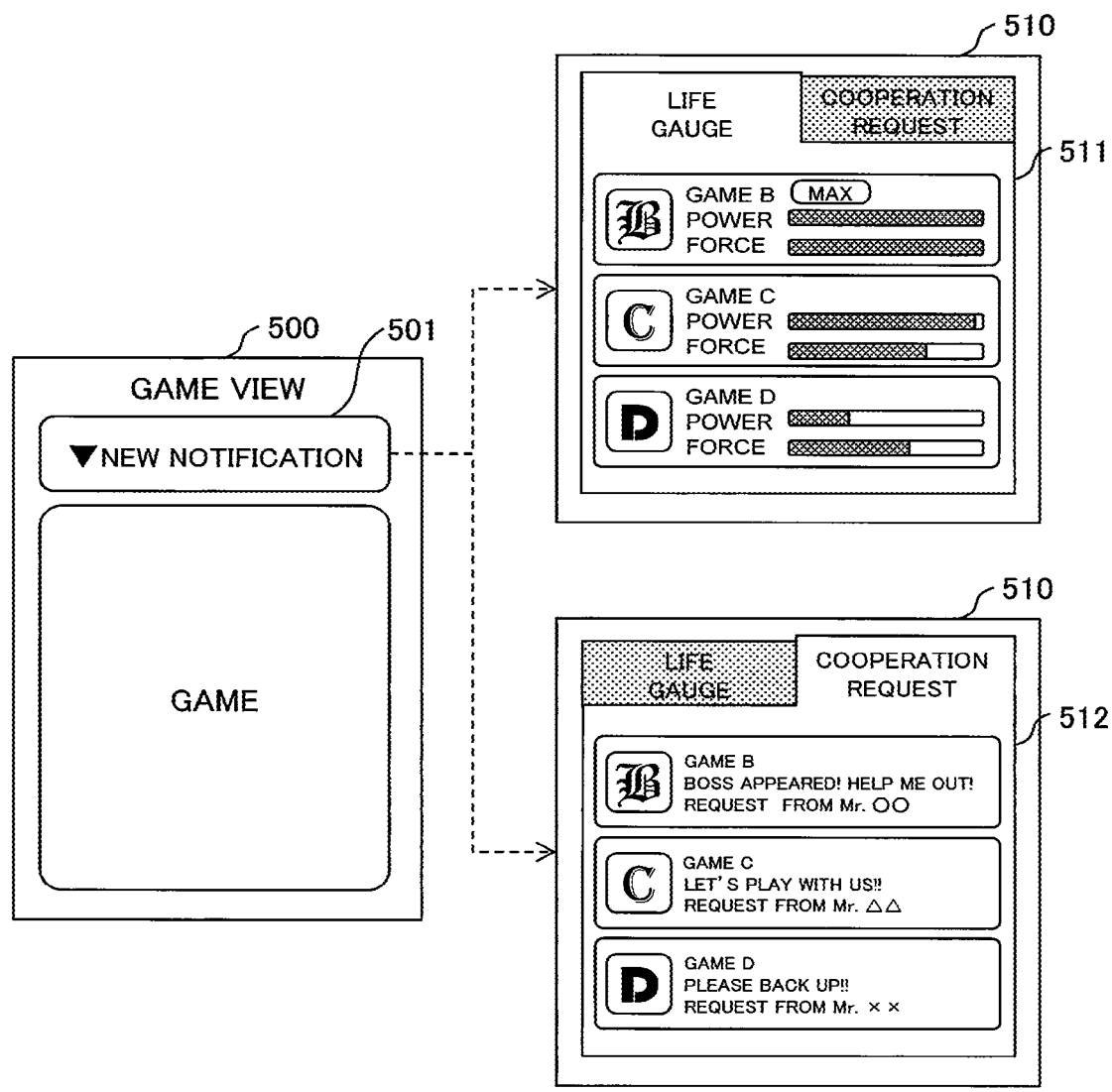
FIG. 3 is an explanatory diagram showing an exemplary view in the system of FIG. 1.

In this case, as illustrated in FIG. 3, a game view 500 is output to the display of the user device 10. The game view 500 includes a new notification link 501. The new notification link 501 includes a message indicating that a new notification has been received.

In a case where the user of the user device 10 selects the new notification link 501, the controller 21 retrieves and extracts the notification management information associated with the user ID of the user in the storage section for notification information 23. In other words, the notification transfer section 214 reads the notification management information associated with the user ID out of the storage section for notification information 23. The notification transfer section 214 arranges the read-out notification management information for the respective notification types in order of new arrival, and outputs the notification management information to the display of the user device 10.

In this case, as illustrated in FIG. 3, a details display view 510 is output to the display of the user device 10. The details display view 510 includes a "life gauge" tab and a "cooperation request" tab corresponding to the notification types of the notifications retrieved from the respective game servers 30 of the other applications B, C, and D. In a case where the user selects the "life gauge" tab, a life gauge view 511, which shows the life information on the user's game character retrieved from the respective game servers 30, is displayed. In a case where the user selects the "cooperation request" tab, a cooperation request view 512, which shows the cooperation requests retrieved from the other users through the respective game servers 30, is displayed.

The above described embodiment may have the following advantages:
(1) The management server 20 is used as a platform that manages users who use a plurality of applications through the user devices 10. The management server 20 includes the controller 21, the storage section for user information 22, and the storage section for notification information 23. The notifications related to the plurality of applications can be integrally ascertained with respect to the respective users by the storage section for notification information 23 in the platform. Therefore, even in a case where providers of the plurality of applications are different from each other, the notifications can be supplied to the users, so that it is possible to encourage the users to actively use the applications as a whole.
(2) The controller 21 performs the in-game display process (Step S2-5). The details display view 510 output to the display of the user device 10 includes the life gauge view 511, which shows the life information retrieved from the respective game servers 30. Therefore, since the notification is issued in the game application in use as the in-game display process, there is no need to activate a separate application for displaying the notification. In the normal transfer scheme, the separate application for displaying the notification needs to be activated in addition to the application in use. In the in-game display process of the present embodiment, the notification is displayed in a view of the application in use. Therefore, even while the application is being used, the notification can be output timely. Consequently, there is a strong possibility that real-time reporting to the user can be made successfully. In a case where the life of the game character is recovered, the user can also play a game different from the application in use. Therefore, since the user can know the status of another game in a timely manner, the user can go from game to game more smoothly according to the status.
(3) The controller 21 performs the in-game display process (Step S2-5). The details display view 510 output to the display of the user device 10 includes the cooperation request view 512, which shows the cooperation requests retrieved from the other users through the respective game servers 30. Therefore, since the user can know the cooperation requests from the other users in a timely manner, it is possible to readily shift to another game according to the status. Accordingly, the user can go from game to game more smoothly.
(4) In a case where it is determined that the user device 10 is not online ("NO" in Step S2-3), the controller 21 performs the normal display process (Step S2-4). In this case, the notification may be performed as in the conventional art.

In the first embodiment, the display method of the notification is changed according to the status of the user device 10. In a second embodiment, it is additionally determined whether the online notification is necessary according to relevance between the user device 10 and a notification source. In this case, the storage section for user information 22 stores user relevance information for each user, which indicates the relationship of the user with respect to another user and the game.

In the user relevance information, for example, an evaluation value indicating evaluation of relevance between the users is recorded. In this second embodiment, users who frequently associate with other users such as SNS friends and fellows sharing a plurality of applications (for example, games) are set to have a higher evaluation value.

Further, in the user relevance information, an evaluation value indicating evaluation of a usage frequency of the game is recorded. A game having a high usage frequency is set to have a higher evaluation value.

Further, the notification transfer section 214 stores data relating to a reference value which is used to evaluate the relevance with the user. The controller 21 performs the notification transferring process using these evaluation values and the reference value.

Figure 4:
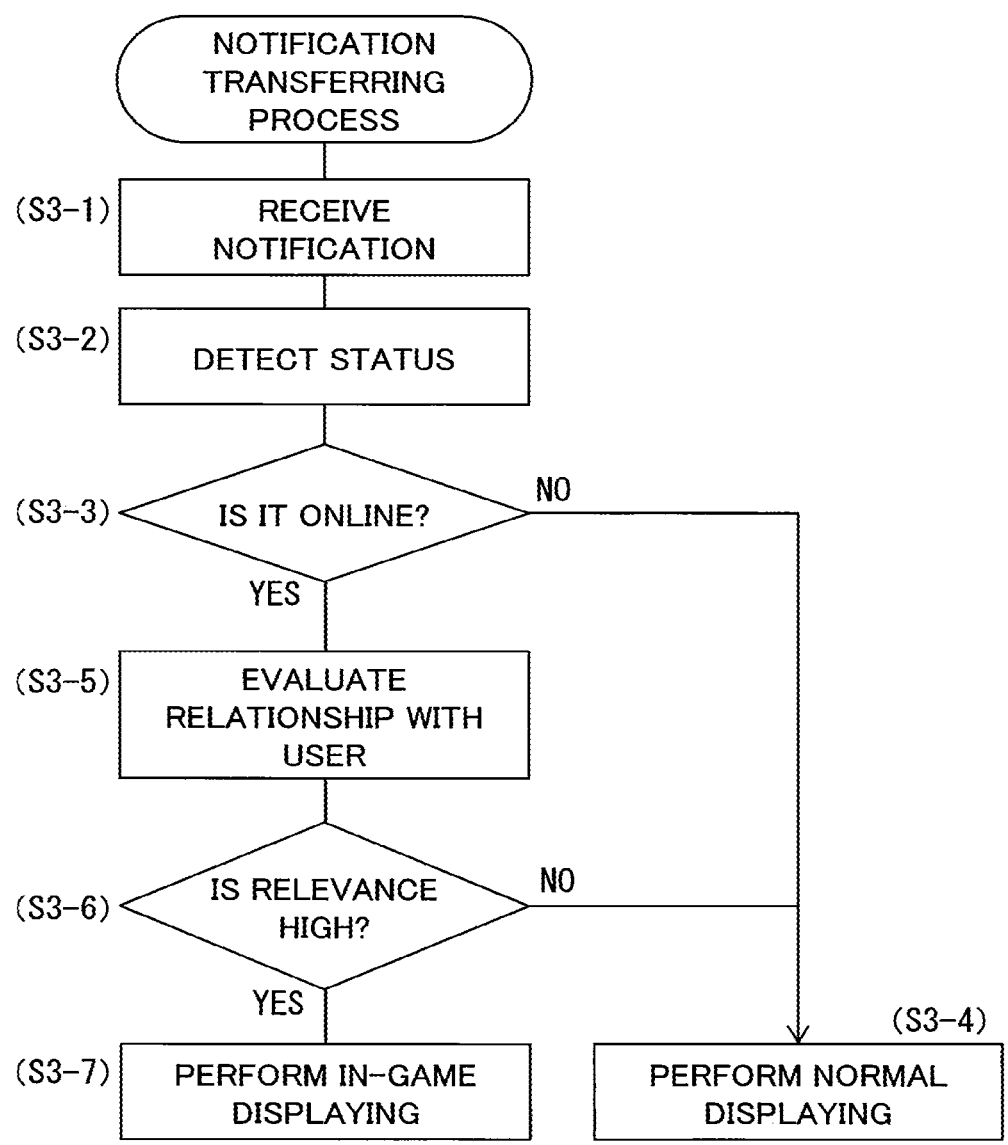
FIG. 4 is an explanatory diagram showing a processing procedure in a system according to a second embodiment.

The notification transferring process will now be described with reference to FIG. 4. First, similarly to Step S2-1, the controller 21 performs the notification receiving process (Step S3-1). Similarly to Step S2-2, the controller 21 performs the status detecting process (Step S3-2). Similarly to Step S2-3, the controller 21 performs the determining process to determine whether the user device 10 is online (Step S3-3).

In a case where it is determined that the user device 10 is not online ("NO" in Step S3-3), the controller 21, similarly to Step S2-4, performs the normal display process (Step S3-4). In contrast, in a case where it is determined that the user device 10 is online ("YES" in Step S3-3), the controller 21 performs a process of evaluating the relationship with the user (Step S3-5). Specifically, the notification transfer section 214 retrieves the evaluation values of transmission sources (games, other users, or the like) of a new notification based on the user relevance information stored in the storage section for user information 22. The notification transfer section 214 sums up the evaluation values of the games, the other users, or the like, which have been extracted from the user relevance information, and calculates a comprehensive evaluation value.

Next, the controller 21 performs the determining process to determine whether the relevance is high (Step S3-6). Specifically, the notification transfer section 214 determines whether the calculated comprehensive evaluation value is higher than the reference value.

In a case where it is determined that the comprehensive evaluation value is equal to or less than the reference value and the relevance is low ("NO" in Step S3-6), the controller 21, similarly to Step S2-4, performs the normal display process (Step S3-4).

On the other hand, in a case where it is determined that the comprehensive evaluation value is higher than the reference value and the relevance is high ("YES" in Step S3-6), the controller 21, similarly to Step S2-5, performs the in-game display process (Step S3-7).

According to the second embodiment, the following advantage is additionally achieved:
(5) 21 performs a process of evaluating the relationship with the user (Step S3-5). In a case where it is determined that the relevance is low ("NO" in Step S3-6), the controller 21 performs the normal display process (Step S3-4). In contrast, in a case where it is determined that the relevance is high ("YES" in Step S3-6), the controller 21 performs the in-game display process (Step S3-7). Therefore, it is possible to issue a notification in a timely manner in consideration of the level of the relevance between the user and the game and the statuses of the other users.

In the first embodiment, the display method of the notification is changed according to the status of the user device 10. In a third embodiment, whether the online notification is necessary is determined according to the status of the user device 10 and the urgency of notification. In this case, the notification transfer section 214 stores urgency evaluation information for evaluating the urgency of notification and status evaluation information indicating the status of the user device 10.

In the urgency evaluation information, for example, a notification evaluation value indicating evaluation of the urgency based on a keyword contained in the notification is contained. In the present embodiment, in a case where it is expected that the user at the transmission source makes a strong request for cooperation such as a request for cooperation in a battle where a strong enemy appears, the evaluation value is set to be high.

Further, in the status evaluation information, a status evaluation value is contained that indicates the progress status of an application (game) to which the user of the user device 10 has logged in. For example, in the case of a status where attention is required for the logged-in user during, for example, a battle in the game, the status evaluation value is set to be high.

Figure 5:
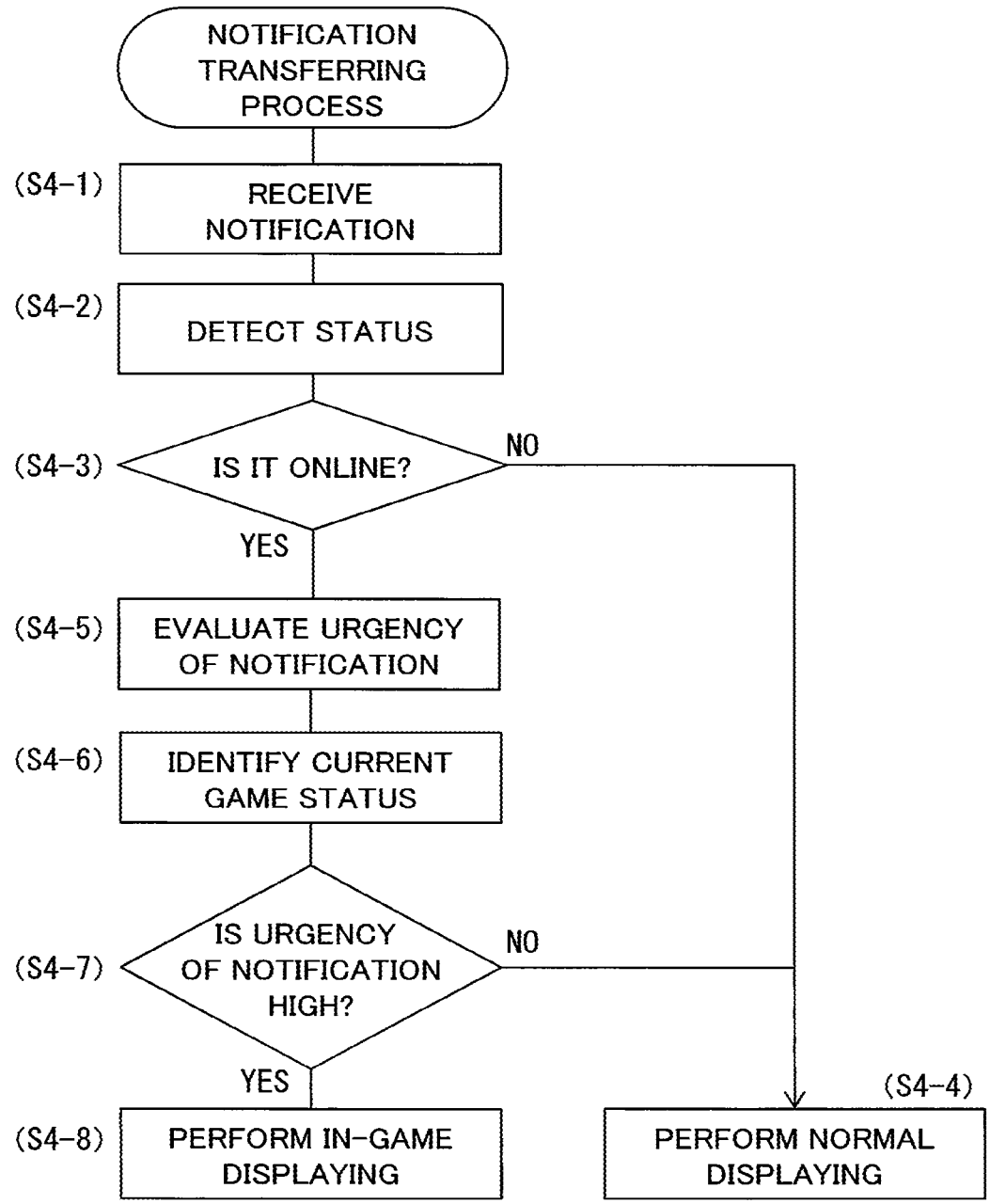
FIG. 5 is an explanatory diagram showing a processing procedure in a system according to a third embodiment.

The controller 21 performs the notification transferring process using these evaluation values. The notification transferring process will be described with reference to FIG. 5. First, similarly to Step S2-1, the controller 21 performs the notification receiving process (Step S4-1). In this case, similarly to Step S2-2, the controller 21 performs the status detecting process (Step S4-2). Next, similarly to Step S2-3, the controller 21 performs the determining process to determine whether the user device 10 is online (Step S4-3). In a case where it is determined that the user device 10 is not online ("NO" in Step S4-3), the controller 21, similarly to Step S2-4, performs the normal display process (Step S4-4).

On the other hand, in a case where it is determined that the user device 10 is online ("YES" in Step S4-3), the controller 21 performs a process of evaluating the urgency of notification (Step S4-5). Specifically, the notification transfer section 214 calculates an urgency evaluation value based on the keyword contained in the notification using the stored urgency evaluation information.

Next, the controller 21 performs a process of identifying a current game status (Step S4-6). Specifically, the notification transfer section 214 retrieves a game progress status (the status) from the game server 30 to which the user of the user device 10 has logged in. The notification transfer section 214 calculates the status evaluation value based on the game progress status using the stored status evaluation information.

Next, the controller 21 performs the determining process to determine whether the urgency of notification is high (Step S4-7). Specifically, the notification transfer section 214 compares the urgency evaluation value with the status evaluation value. In a case where the urgency evaluation value is higher than the status evaluation value, it is determined that the urgency of notification is high.

In a case where the urgency evaluation value is equal to or less than the status evaluation value, the notification transfer section 214 determines that the urgency of notification is low ("NO" in Step S4-7). In this case, similarly to Step S2-4, the controller 21 performs the normal display process (Step S4-4).

On the other hand, in a case where the urgency evaluation value is higher than the status evaluation value, the notification transfer section 214 determines that the urgency of notification is high ("YES" in Step S4-7). In this case, similarly to Step S2-5, the controller 21 performs the in-game display process (Step S4-8).

This third embodiment additionally achieves the following advantage:

(6) The controller 21 performs a process of evaluating the urgency of notification (Step S4-5) and a process of identifying the current game status (Step S4-6). The controller 21 performs the determining process to determine whether the urgency of notification is high (Step S4-7). In a case where it is determined that the urgency of notification is low ("NO" in Step S4-7), the controller 21 performs the normal display process (Step S4-4). In contrast, in a case where it is determined that the urgency of notification is high ("YES" in Step S4-7), the controller 21 performs the in-game display process (Step S4-8). Therefore, it is possible to issue a notification accurately and timely in consideration of the status of the logged-in user.

In the first embodiment, the display method of the notification is changed according to the status of the user device 10. In a fourth embodiment, whether the online notification is necessary is determined according to a correspondence history on the notification. In this case, the storage section for notification information 23 stores correspondence history information on the status of the user device 10 when the notification is received and on a correspondence record relating to the notification, in association with the notification management information of each notification. In the present embodiment, information on whether or not detailed information has been browsed by selecting the new notification link is stored as the correspondence record.

The notification transfer section 214 stores data relating to the reference value for evaluating the correspondence record on the notification. The controller 21 performs the notification transferring process using the correspondence history information.

Figure 6:
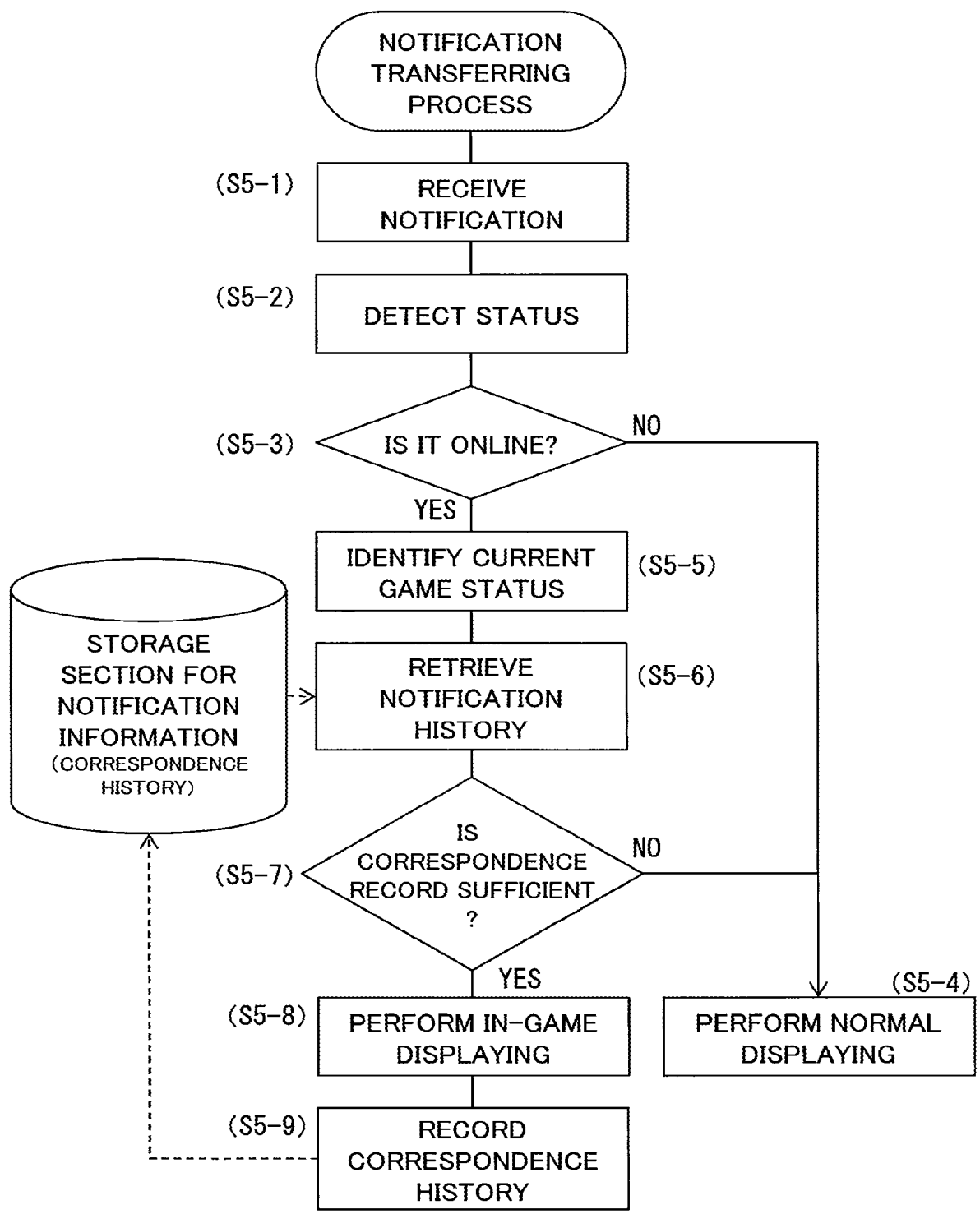
FIG. 6 is an explanatory diagram showing a processing procedure in a system according to a fourth embodiment.

The notification transferring process will now be described with reference to FIG. 6. First, similarly to Step S2-1, the controller 21 performs the notification receiving process (Step S5-1). Similarly to Step S2-2, the controller 21 performs the status detecting process (Step S5-2). Similarly to Step S2-3, the controller 21 performs the determining process to determine whether the user device 10 is online (Step S5-3). In a case where it is determined that the user device 10 is not online ("NO" in Step S5-3), the controller 21, similarly to Step S2-4, performs the normal display process (Step S5-4).

On the other hand, in a case where it is determined that the user device 10 is online ("YES" in Step S5-3), the controller 21 performs a process of identifying the current game status (Step S5-5). Specifically, the notification transfer section 214 retrieves the game progress status (the status) from the game server 30 of the application to which the user of the user device 10 has logged in.

Next, the controller 21 performs a process of retrieving a notification history (Step S5-6). For example, the controller 21 identifies a correspondence history that has the same feature as that of the received notification among past notifications in the storage section for notification information 23. Specifically, the notification transfer section 214 retrieves the correspondence history information that is associated with the game ID of the game in progress, the notification type of the received notification, and the status of the user device 10 in the storage section for notification information 23.

Next, the controller 21 performs the determining process to determine whether the correspondence record is sufficient (Step S5-7). Specifically, the notification transfer section 214 calculates the rate (a browsing frequency) of browsing the detailed information using the correspondence history information. In a case where the browsing frequency is higher than a reference value, it is determined that the correspondence record is sufficient.

In a case where the browsing frequency is equal to or less than the reference value, the notification transfer section 214 determines that the correspondence record is not sufficient ("NO" in Step S5-7). In this case, similarly to Step S2-4, the controller 21 performs the normal display process (Step S5-4).

In contrast, in a case where the browsing frequency is higher than the reference value, the notification transfer section 214 determines whether the correspondence record is sufficient ("YES" in Step S5-7). In this case, similarly to Step S2-5, the controller 21 performs the in-game display process (Step S5-8).

The controller 21 performs a process of recording the correspondence history (Step S5-9). Specifically, the notification transfer section 214 records, in the storage section for notification information 23, the status of the user device 10 when the notification was received and the fact that the detailed information has been browsed in association with the notification management information.

This fourth embodiment additionally achieves the following advantage:
  (7) The controller 21 performs a process of retrieving the notification history (Step S5-6). In a case where it is determined that the correspondence record is not sufficient ("NO" in Step S5-7), the controller 21 performs the normal display process (Step S5-4). On the other hand, in a case where it is determined that the correspondence record is sufficient ("YES" in Step S5-7), the controller 21 performs the in-game display process (Step S5-8). Therefore, it is possible to issue the notification timely and accurately according to the correspondence history. Accordingly, it is possible to suppress an unnecessary notification and to issue the notification according to preference of the user. The need to issue the notification can be determined in the application display using the correspondence history according to the status of the application.

Any or all of the above described embodiments may be modified as follows. In the above embodiments, the controller 21 performs the notification receiving process (Step S2-1). Instead of this, the notification transfer section 214 may retrieve the life information of a second game other than a first game in progress among the currently-used games of the user from the respective game servers 30. In a case where a life gauge value becomes a maximum value, the controller 21 performs the in-game display process.

In the third embodiment, the controller 21 performs the process of identifying the current game status (Step S4-6), and the determining process to determine whether the urgency of notification is high (Step S4-7). In the above third embodiment, in a case where attention is required for the logged-in user, the status evaluation value is set to be high; that is, a high status evaluation value is assigned according to the game progress status. The method for assigning the status evaluation value is not limited thereto. For example, the status evaluation value may be set according to the life gauge value of the game character of the game in progress. For example, in a case where the life gauge value is low, the status evaluation value is set to be low. Therefore, in a case where the life of the user's game character of the game in progress is low, the in-game display process (Step S4-7) is performed. Consequently, the user can go from game to game more smoothly.

Further, the life information of the currently-used game of the user is also possible to be included in the stored status evaluation information. For example, the notification transfer section 214 retrieves and stores the life gauge value of the game character of the logged-in user in each game from the respective game servers 30. The notification transfer section 214 may set the status evaluation value based on the comparison between the life gauge value of the first game in progress and the life gauge value of the second game other than the first game among the currently-used games of the user. For example, in a case where the life gauge value of the first game is smaller than that of the second game, the status evaluation value is set to be low. Therefore, according to the comparison between the status in the first game and the status in the second game, it is possible to determine whether or not the in-game displaying is necessary.

Further, the controller 21 may arrange the game characters by changing a display order in the in-game displaying based on the life of the game characters in a second currently-used game. In this case, the notification transfer section 214 arranges the game characters based on the life gauge values of the game characters retrieved from the respective game servers 30 such that one having a high life gauge value comes first, that is, a descending order.

In the above third embodiment, the controller 21 performs a process of evaluating the urgency of notification (Step S4-5), and a process of identifying the current game status (Step S4-6). The controller 21 compares the urgency evaluation value with the status evaluation value in the determining process to determine whether the urgency of notification is high (Step S4-7). On the basis only of the status evaluation information of the game without referring to the urgency evaluation value, the controller 21 may determine whether the in-game displaying is performed. For example, in a case where the life gauge value of the game in progress is set to the reference value (for example, zero), the notification transfer section 214 performs the in-game display process (Step S4-8). In a case where there is still life (that is, not zero), the normal display process is performed (Step S4-4).

In the above embodiments, in a case where it is determined that the user device 10 is online ("YES" in Step S2-3), the controller 21 performs the in-game display process (Step S2-5). Specifically, the notification transfer section 214 identifies a game to which the user of the user device 10 has logged in based on the status in the user management information. The notification transfer section 214 outputs the online notification to the game view. Alternatively, the notification method may be changed according to the type of the game at the login destination. In this case, the storage section for user information 22 stores the game ID, which can be displayed in the in-game displaying for each user. The controller 21 identifies the game ID of the application at the login destination, to which the user of the user device 10 has logged in. The controller 21 determines whether the in-game displaying is allowed for the game to which the user has logged in. Therefore, it is possible to determine whether the in-game notification is necessary according to the application in use.

In the above embodiments, the description has been given of a case where the notification is issued in games serving as applications, but notification target applications are not limited to games. The notification can be issued in a plurality of applications provided in the platform.

In the above embodiments, the management server 20 retrieves the notification from the respective game servers 30, but the sender of the notification is not limited to the game server 30. Similarly to electronic mails or the like, the management server 20 may directly retrieve the notification from the respective user devices 10.

In the above embodiments, the life gauge value and the cooperation request of the game character are used as the notification type, but the notification type is not limited thereto. A notification relating to an event of another game and a status of the game may be supplied as the notification type.

The invention claimed is:

1. A method for operating a management server comprising a controller having circuitry and a memory with instructions executed by the circuitry that configures the management server to:
   check a use status of a first application currently in use by a user at a user device;
   obtain a life status for a second application that is different than the first application;
   detect when the life status for the second application has reached a predetermined value;
   cause information relating to the life status for the second application to be displayed on the user device when detecting the life status for the second application has reached the predetermined value while the first application remains in use at the user device,
   wherein the life status for the second application corresponds to a current life level between a minimal life level and maximum life level.

2. A method according to claim 1, the memory further comprising an instruction executed by the circuitry that configures the management server to cause information relating to a life status for a third application, different than the first and second applications, to be displayed on the user device at the same time as the information relating to the life status for the second application.

3. A method according to claim 2, the memory further comprising an instruction executed by the circuitry that configures the management server to cause information relating to a life status for a fourth application, different than the first, second, and third applications, to be displayed on the user device at the same time as the information relating to the life status for the second and third applications.

4. A method according to claim 1, the memory further comprising an instruction executed by the circuitry that configures the management server to:
   determine a level of relevance between the user and the second application,
   wherein the information relating to the life status for the second application is caused to be displayed when the determined level of relevance exceeds a threshold.

5. A method according to claim 1, the memory further comprising an instruction executed by the circuitry that configures the management server to:
   determine a user status of the user device based on a life status for the first application;
   cause the information related to the life status for the second application to be displayed when the determined user status is below a threshold.

6. A method according to claim 1, the memory further comprising an instruction executed by the circuitry that configures the management server to:
   store a correspondence history of notifications provided to the user device;
   determine a rate at which notifications have been provided to the user device while the first application has been in use based on the stored correspondence history, the rate corresponding to a number of notifications over a predetermined period of time;
   cause the life status information for the second application to be displayed when the determined rate is above a threshold.

7. A method according to claim 1, wherein the life status information corresponds to life information of a game character of a user of the second application.

8. A management server comprising a controller having circuitry and a memory with instructions executed by the circuitry that configures the management server to:
   check a use status of a first application currently in use by a user at a user device;
   obtain a life status for a second application that is different than the first application;
   detect when the life status for the second application has reached a predetermined value;
   cause information relating to the life status for the second application to be displayed on the user device when detecting the life status for the second application has reached the predetermined value while the first application remains in use at the user device,
   wherein the life status for the second application corresponds to a current life level between a minimal life level and maximum life level.

9. A management server according to claim 8, the memory further comprising an instruction executed by the circuitry that configures the management server to cause information relating to a life status for a third application, different than the first and second applications, to be displayed on the user device at the same time as the information relating to the life status for the second application.

10. A management server according to claim 9, the memory further comprising an instruction executed by the circuitry that configures the management server to cause information relating to a life status for a fourth application, different than the first, second, and third applications, to be displayed on the user device at the same time as the information relating to the life status for the second and third applications.

11. A management server according to claim 8, the memory further comprising an instruction executed by the circuitry that configures the management server to:
   determine a level of relevance between the user and the second application,
   wherein the information relating to the life status for the second application is caused to be displayed when the determined level of relevance exceeds a threshold.

12. A management server according to claim 8, the memory further comprising an instruction executed by the circuitry that configures the management server to:
   determine a user status of the user device based on a life status for the first application;
   cause the information related to the life status for the second application to be displayed when the determined user status is below a threshold.

13. A management server according to claim 8, the memory further comprising an instruction executed by the circuitry that configures the management server to:
   store a correspondence history of notifications provided to the user device;
   determine a rate at which notifications have been provided to the user device while the first application has been in use based on the stored correspondence history, the rate corresponding to a number of notifications over a predetermined period of time;
   cause the life status information for the second application to be displayed when the determined rate is above a threshold.

14. A management server according to claim 8, wherein the life status information corresponds to life information of a game character of a user of the second application.

15. A non-transitory, computer-readable medium storing instructions that, when executed by a processor on a computer, control the computer to implement a method comprising:
   checking a use status of a first application currently in use by a user at a user device;
   obtaining a life status for a second application that is different than the first application;
   detecting when the life status for the second application has reached a predetermined value;
   causing information relating to the life status information for the second application to be displayed on the user device when detecting the life status for the second application has reached the predetermined value while the first application remains in use at the user device,
   wherein the life status for the second application corresponds to a current life level between a minimal life level and maximum life level.

16. A non-transitory, computer-readable medium according to claim 15 further storing instructions to implement a method comprising:
   causing information relating to a life status for a third application, different than the first and second applications, to be displayed on the user device at the same time as the information relating to the life status for the second application.

17. A non-transitory, computer-readable medium according to claim 16 further storing instructions to implement a method comprising:
   causing information relating to a life status for a fourth application, different than the first, second, and third applications, to be displayed on the user device at the same time as the information relating to the life status for the second and third applications.

18. A non-transitory, computer-readable medium according to claim 15 further storing instructions to implement a method comprising:
   determining a level of relevance between the user and the second application,
   wherein the information relating to the life status for the second application is caused to be displayed when the determined level of relevance exceeds a threshold.

19. A method according to claim 1, the memory further comprising an instruction executed by the circuitry that configures the management server to cause the information related to the life status for the second application to be displayed when the life status for the first application is below a threshold.

20. A management server according to claim 13, the memory further comprising an instruction executed by the circuitry that configures the management server to cause the information related to the life status for the second application to be displayed when the life status for the first application is below a threshold.

* * * * *